No. 700,839. Patented May 27, 1902.
F. L. SESSIONS.
MAGNETIC CLUTCH.
(Application filed Sept. 9, 1899.)
(No Model.) 2 Sheets—Sheet 1.
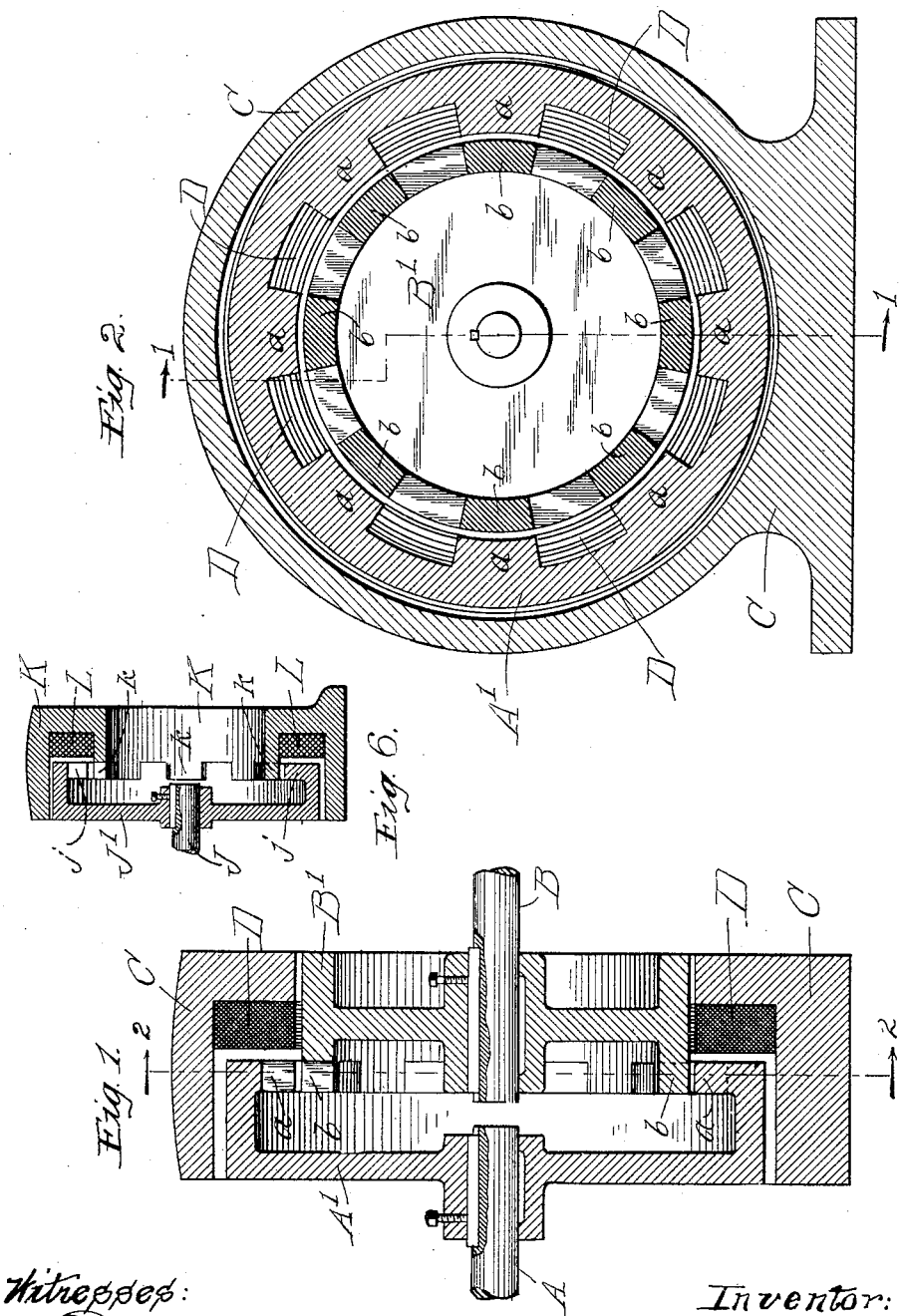
Witnesses:
Inventor:
Frank L. Sessions
By Carter - Graves
Attys

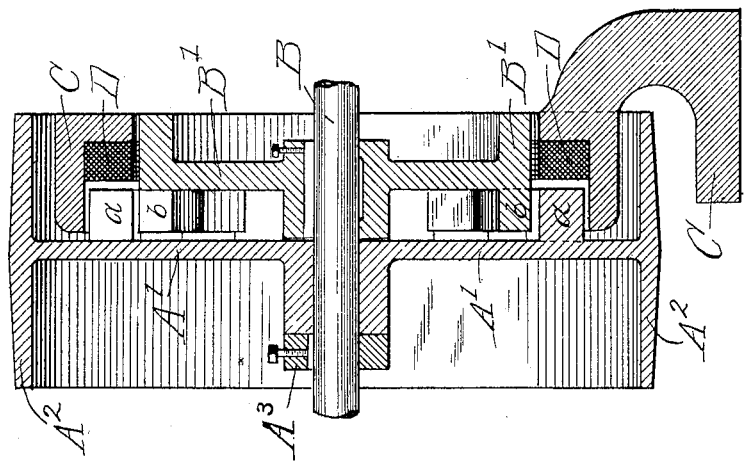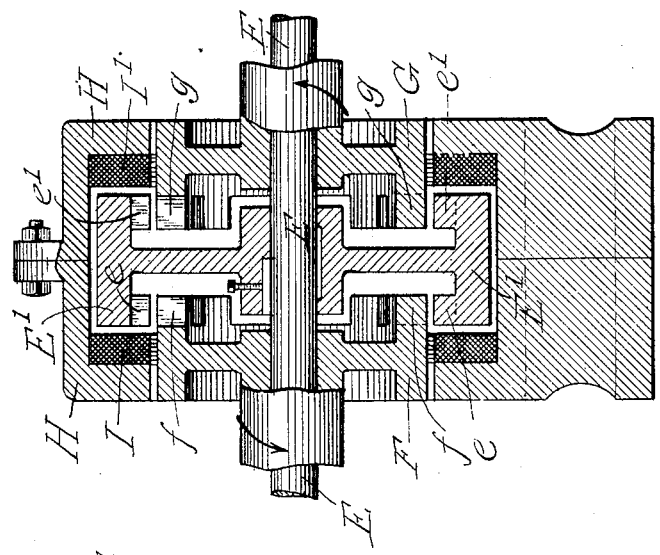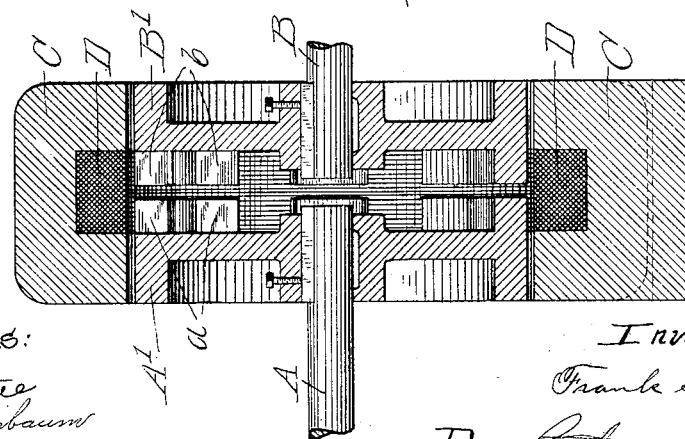

UNITED STATES PATENT OFFICE.

FRANK L. SESSIONS, OF OAKPARK, ILLINOIS, ASSIGNOR TO SIEMENS & HALSKE ELECTRIC COMPANY OF AMERICA, OF CHICAGO, ILLINOIS, A CORPORATION OF ILLINOIS.

MAGNETIC CLUTCH.

SPECIFICATION forming part of Letters Patent No. 700,839, dated May 27, 1902.

Application filed September 9, 1899. Serial No. 729,962. (No model.)

*To all whom it may concern:*

Be it known that I, FRANK L. SESSIONS, of Oakpark, in the county of Cook and State of Illinois, have invented certain new and useful Improvements in Magnetic Clutches, of which the following is a specification.

This invention relates to improvements in magnetic clutches; and it consists in the matters hereinafter set forth, and particularly pointed out in the appended claim.

In the accompanying drawings, Figure 1 is an axial sectional elevation of a construction embodying my invention, taken on line 1 1 of Fig. 2. Fig. 2 is a similar view taken on line 2 2 of Fig. 1. Fig. 3 is an axial section of another form of device embodying my invention. Figs. 4 and 5 are similar views of still other forms. Fig. 6 is a similar view of a magnetic brake constructed in accordance with my improvements.

Referring first to the construction shown in Figs. 1 and 2, A and B designate two shafts arranged end to end and separately supporting two proximately-arranged spiders A' and B', respectively. Said spiders are provided with annular series of pole-pieces $a$ and $b$, respectively, which project toward each other, but are not in actual contact. C is an annular and in this instance stationary frame surrounding the spiders A' and B', and within this frame is wound an annular coil D, of insulated copper wire or the like, the terminals of which are connected with any suitable source of electrical energy. (Not herein illustrated.) The energizing of the coil D sets up a magnetic field in the surrounding metal of the rims of the spiders and frame and causes the poles $a$ and $b$ to become magnetic poles of opposite sign. The two series of poles therefore attract each other and tend to maintain their two spiders in fixed relation relatively to each other, with the poles in closest possible proximity, as shown in Fig. 2. Either shaft being then rotated to act as the driving-shaft, it is only necessary to turn on the current in order to cause the other shaft to be driven by it, the magnetic attraction between the poles of the respective spiders serving to gradually start and accelerate the driven shaft until it attains the speed of the driving-shaft. This action may be regulated to take place as smoothly and gradually as desired by regulating the current supplied to the coil, and the shutting off of said current will permit the driven part to come as gradually to rest.

Wide variations in the construction and arrangement of the magnetic clutch described may obviously obtain. In Fig. 1 the annular series of poles $a$ of the spider A' is shown as surrounding the poles $b$ of the spiders B', and the coil D is located at one side of the spider A' and surrounds the spider B'. In the construction shown in Fig. 3 the spiders are of the same size and shape, and the poles $a$ and $b$ are arranged end to end in circular series of the same diameter, while the coil D extends annularly around both series.

In Fig. 5, A' is the spider of a loose pulley and supports a pulley-rim A². This pulley is shown as mounted loosely upon the shaft B between the spider B' and a collar A³ and will obviously be set to rotating with the shaft B when the coil D is energized.

In Fig. 4 I have shown a construction suitable for regulators or other purposes in which it may be desirable to rotate a shaft in one direction or the other, according as a current is applied to one or the other of two coils. In this construction a single shaft E supports a central rigidly-attached spider E' and two lateral spiders F and G, which are rotated in opposite directions and independently of the shaft E by suitable driving connections. (Not herein illustrated.) On one side the central spider E' is provided with an annular series of pole-pieces $e$, arranged in juxtaposition to an annular series of pole-pieces $f$ of the spider F. On its other side said central spider is provided with a second series of pole-pieces $e'$, similarly arranged with respect to an annular series of pole-pieces $g$ of the spider G. An annular frame H surrounds all three spiders and incloses two annular coils I I', arranged adjacent to the poles $e f$ and $e' g$, respectively. Said coils are arranged to be energized alternately by connections (not herein illustrated) with a suitable source or sources of electrical energy. Then when the coil I is energized the central spider, and consequently the shaft, will be influenced to rotate with the spider F, while when the coil I' is energized said central spider and shaft will be influenced to rotate oppositely with the spider G, so that by connecting said shaft with any suitable regulating mechanism the latter may be controlled accordingly as the current is shunted through one or the other of the two coils.

The principles of construction embodied in the clutch mechanism described will be understood to be equally applicable to a brake mechanism in which the energizing of the coil will act to retard and check the motion of a rotary part instead of setting up such rotary motion. For example, in Fig. 6 I have shown a shaft J provided with a rigidly-attached spider J' and inclosed within the surrounding stationary frame K, containing an annular coil L, the spider being provided with an annular series of poles $j$ and the surrounding frame with an adjacent annular series of stationary poles $k$, between which and the poles $j$ an attraction is set up when the coil L is energized. The turning on of the current in this construction will obviously operate against the further rotation of the shaft J and tend to hold it immovable as long as the current continues to flow.

The principal advantage of the construction described consists not only in the absence of all friction surfaces or parts liable to become worn, but in the doing away with moving contacts of any kind by the stationary arrangement of the coil or coils. It will, however, be understood that the invention might be applied in a construction in which the coil rotates and is supplied with current through a pair of slip rings or commutators, should such construction prove desirable.

I claim as my invention—

The combination with two revoluble parts mounted to rotate in opposite directions, of an intermediate freely-revoluble part, annular series of pole-pieces on each of the first two parts arranged in juxtaposition to annular series of pole-pieces on the intermediate part, a fourth annular part extending around the revoluble parts, and coils of wire inclosed between the fourth part and revoluble parts and extending circumferentially in proximity to each of the two sets of pole-pieces, whereby the freely-revoluble part will be rotated in the one direction or the other according as one or the other of the coils is energized.

In testimony that I claim the foregoing as my invention I affix my signature, in presence of two subscribing witnesses, this 28th day of September, A. D. 1899.

FRANK L. SESSIONS.

Witnesses:
HENRY W. CARTER,
ALBERT H. GRAVES.